US011580704B2

(12) United States Patent
Wilson et al.

(10) Patent No.: US 11,580,704 B2
(45) Date of Patent: Feb. 14, 2023

(54) BLENDING VIRTUAL ENVIRONMENTS WITH SITUATED PHYSICAL REALITY

(71) Applicant: MICROSOFT TECHNOLOGY LICENSING, LLC, Redmond, WA (US)

(72) Inventors: Andrew D. Wilson, Seattle, WA (US); Christian Holz, Seattle, WA (US); Eyal Ofek, Redmond, WA (US); Jeremy Hartmann, Waterloo (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/227,078

(22) Filed: Apr. 9, 2021

(65) Prior Publication Data

US 2021/0241536 A1 Aug. 5, 2021

Related U.S. Application Data

(63) Continuation of application No. 16/390,222, filed on Apr. 22, 2019, now Pat. No. 11,004,269.

(51) Int. Cl.
*G06T 19/00* (2011.01)
*G06T 19/20* (2011.01)
(52) U.S. Cl.
CPC ............ *G06T 19/006* (2013.01); *G06T 19/20* (2013.01); *G06T 2219/2012* (2013.01)

(58) Field of Classification Search
CPC .................. G06T 19/006; G06T 19/20; G06T 2219/2012
See application file for complete search history.

(56) References Cited

U.S. PATENT DOCUMENTS

2017/0278304 A1* 9/2017 Hildreth ................ G06F 3/0484
2018/0260668 A1* 9/2018 Shen ....................... G06T 11/00

\* cited by examiner

*Primary Examiner* — Chong Wu
(74) *Attorney, Agent, or Firm* — Shook, Hardy & Bacon LLP

(57) ABSTRACT

Various embodiments are provided herein for tracking a user's physical environment, to facilitate on-the-fly blending of a virtual environment with detected aspects of the physical environment. Embodiments can be employed to facilitate virtual roaming by compositing virtual representations of detected physical objects into virtual environments. A computing device coupled to a HMD can select portions of a depth map generated based on the user's physical environment, to generate virtual objects that correspond to the selected portions. The computing device can composite the generated virtual objects into an existing virtual environment, such that the user can traverse the virtual environment while remaining aware of their physical environment. Among other things, the computing device can employ various blending techniques for compositing, and further provide image pass-through techniques for selective viewing of the physical environment while remaining fully-immersed in virtual reality.

20 Claims, 8 Drawing Sheets

US 11,580,704 B2

BLENDING VIRTUAL ENVIRONMENTS WITH SITUATED PHYSICAL REALITY

CROSS-REFERENCE TO RELATED APPLICATIONS

This application is a continuation of U.S. application Ser. No. 16/390,222, titled "BLENDING VIRTUAL ENVIRONMENTS WITH SITUATED PHYSICAL REALITY," filed Apr. 22, 2019; which is hereby expressly incorporated by reference in its entirety.

BACKGROUND

Virtual reality technology employs specialized computing hardware and software to provide users with perceptually-real and fully-immersive virtual environments to interact with and explore. Virtual reality technologies can place users into virtual, computer-generated environments, where they can perceive and interact with virtual objects rendered therein. While virtual environments and the virtual objects within them may appear present in a user's perceived virtual environment, they are typically not present in the user's immediate physical world. The same can generally be said about the converse, more specifically, that objects present in the user's immediate physical environment are typically not present in the user's perceived virtual environment.

Virtual environments and virtual objects perceived in virtual reality are graphically rendered for stereoscopic display, to be perceived by a user wearing fully-immersive virtual reality equipment, such as a head-mounted display. By virtue of its fully-immersive nature, virtual reality technology restricts the user's ability to view their physically-surrounding environment, or in other words, the user's real world surroundings. There is, in essence, a clear disconnect between a user's real world environment and a fully-immersive virtual environment in which the user is perceiving within the real world environment.

SUMMARY

Embodiments described herein provide systems and techniques for dynamically blending geometric representations of physical objects detected in a physical environment with a virtual environment. More specifically, a computing device coupled to a head-mounted display (HMD) receives sensor data from a plurality of sensors. Among other things, the sensors generate sensor data that includes, for instance, depth map data and image data associated with the surrounding physical environment. The depth map data is employed by the computing device to responsively generate a geometric representation of the surrounding physical environment and the physical objects located therein. Among other things, the computing device can segment the generated geometric representation, such that each portion of the geometric representation (each of which can independently be a geometric representation) corresponds to a physical object located within the physical environment and detected based on the received sensor data. In some embodiments, the computing device can composite any one or more of the generated geometric representations into a stored virtual environment. In this regard, a realistic computer-generated representation of a physical object can be perceived within the virtual environment when provided for display to the HMD. Physical objects, such as those that could be potentially hazardous to a user moving about a physical environment while fully-immersed in the virtual environment, can be effectively perceived by a user of the HMD. In some aspects, the computer-generated representation can be blended with the virtual environment utilizing a variety of techniques, to facilitate the maintenance of a theme or design of the virtual environment. In some further aspects, any portion of the received image data can be selectively passed-through for display via the HMD, in effect, providing visibility of a corresponding portion of the physical environment. In this way, physical objects can be avoided or physically interacted with based on the facilitated perception thereof, through virtual representations or pass-through image data. The described embodiments enable a user wearing a HMD to safely traverse (e.g., roam, walk about) a physical environment. Among other things, a computing device coupled to the HMD can selectively blend geometric representations of physical objects detected in the physical environment with a virtual environment to be perceived by the user.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
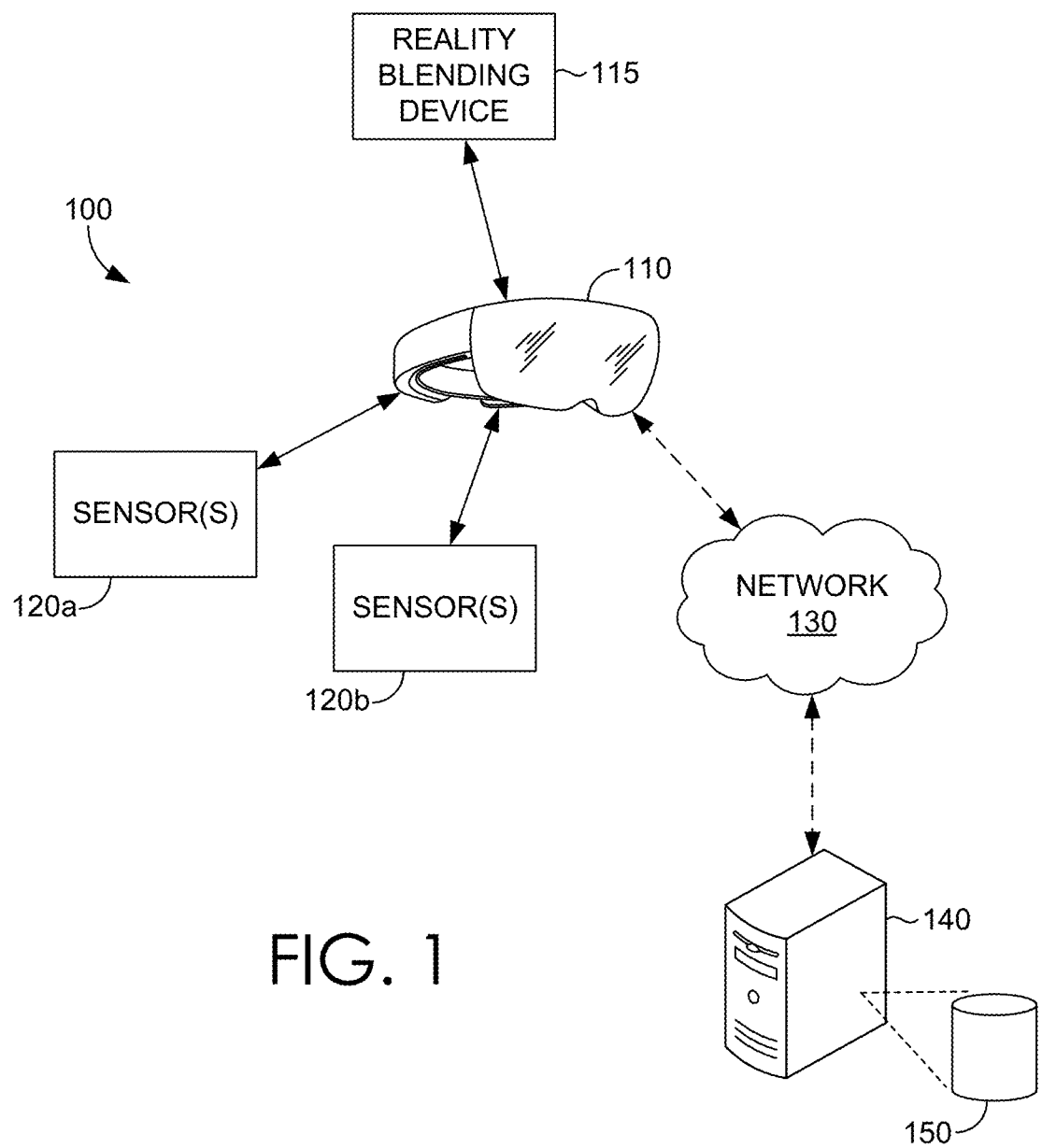
FIG. 1 is a block diagram of an exemplary operating environment for rendering and updating a virtual environment and/or dynamically generated virtual objects on-the-fly, in accordance with some embodiments of the present disclosure.

Immersive technology refers to perceptual and interactive technologies that, in essence, blur the line between the physical world and the simulated world. Perceptual technologies can trick a user's brain into believing that digital information being perceived in virtual space is real. Interactive technologies, on the other hand, can recognize user outputs (e.g., speech, gestures, movements, etc.) detected in physical space, and can respond to it in virtual space, accordingly. Together, perceptual and interactive technologies can provide users with an illusion that an immersive virtual environment or "virtual world" is just as real as the physical environment or "physical world" in which they are present.

Virtual reality (VR) is a fully-immersive technology, where a user of the technology can only perceive a rendered virtual environment and virtual objects therein, as if the perceived visual information was their present reality. While immersed in the virtual world, typically when wearing a head-mounted display (HMD), the user is visually disconnected from the real world. In other words, while a user can still physically roam about in the real world, the user can only perceive the displayed virtual world and the virtual objects therein. The disconnect between the perceived virtual world and the masked physical world presents a drawback in the user experience. More specifically, there is a sensory disconnect for the user, between knowing what is within their surrounding physical environment, while being immersed in the virtual world. This disconnect not only limits the potential of virtual reality experiences, but also poses a hazard to the user, who can easily collide with objects within the physical world without awareness.

Various efforts have been made to address the drawbacks of this sensory disconnect. For instance, some chaperone systems can essentially track a user's location in relation to physical walls surrounding them. More specifically, such chaperone systems display a grid within the user's perceived virtual environment (i.e., via the HMD) to notify the user that they are in close proximity with a physical barrier. Certain physical objects within the physical environment can be detected, such that an outline or silhouette of the detected physical objects can be perceived within the virtual environment. More so, some chaperone systems facilitate the ability for virtual applications to react to the user's physical environment. Specifically, virtual environments can be generated to match the orientation or layout of a room in which the user is physically located. While such solutions facilitate great safety advantages for virtual reality users, the user experience remains wanting. In particular, a user may desire the ability to continuously perceive the physical objects in their physical environment, and would rather not be warned just prior to a collision. The ability for a user to maintain awareness of their physical environment while remaining fully-immersed in virtual reality can be a difficult challenge to overcome. As such, embodiments of the present disclosure describe techniques for effectively bringing the physical environment, or portions thereof, into the virtual environment. In order to maintain realism and thematic consistency with the virtual environment, further embodiments can dynamically select portions (e.g., physical objects) of the physical environment for compositing with the virtual environment. Among other things, one or more geometric representations of physical objects detected within the physical environment can be generated based on received sensor data. The geometric representations can be selectively composited into the virtual environment, and blended with the virtual environment utilizing a variety of techniques that facilitate realism and consistency with the virtual environment's theme (e.g., lighting, color scheme, style). In this way, the user can remain aware of their surrounding physical environment, without being distracted from the user experience provided by the virtual environment being perceived. In some aspects, a user may desire that certain portions or physical objects within their physical environment be clearly visible, that is, not represented as a virtual object or blended into the virtual environment. As such, in accordance with some further embodiments, the present disclosure describes further techniques for facilitating a selective pass-through of image data for display via the HMD. A portion of image data corresponding to a portion of the user's physical environment can be selected for pass-through based on a received user input (e.g., a set of controller inputs) or detected features of a physical object detected within the user's physical environment, among other things. To this end, embodiments of the present disclosure can facilitate the user's ability to maintain continued awareness of their physical environment without taking away from the user experience.

As will be utilized throughout the present disclosure, the terms "real-world" or "physical" can be used interchangeably, both corresponding to tangible or non-virtual environments or objects. Moreover, the term "on-the-fly" or "real-time" are interchangeably referenced to correspond to a responsive behavior, such as the performance of an operation in response to the receipt of data or a signal (e.g., from a sensor). While such responsive behaviors may be limited in speed or response times in some situations, it is contemplated that the responsive behavior is performed in a manner that is preferably substantially instantaneous (e.g., less than 1 second). Further, as will be utilized throughout the present disclosure, the terms "render" and "generate" are interchangeably referenced to correspond to the digital creation of a virtual object or environment, such as one that can be provided for display to a HMD. The terms "object" and "obstruction" are also interchangeably referenced to correspond to "things" that are perceivable whether in a virtual or physical environment. An object or obstruction typically includes walls, people, animals, furniture, plants, or any tangible that could potentially interfere with a user's path of traversal. In some aspects, objects or obstructions can be detected based on sensor data, and typically includes any object that is determined taller than a reference height (e.g., a floor height determined based no sensor data). As one of ordinary skill in the art may appreciate, a movement (e.g., traversal, walking, roaming) within a physical environment can correspond to perceived movement within a virtual environment. That is, as a user changes his/her location (e.g., takes a step) in their physical environment, a corresponding change in location can be perceived in the perceived virtual environment. In this regard, in some aspects, dimensions (e.g., width, length, height, relative distance) of a physical object in a physical environment can correspond to a virtual object in a virtual environment.

At a high level, embodiments of the present disclosure generally provide systems and methods for dynamically rendering and compositing a fully-immersive virtual environment or "scene" with virtual objects generated based on detected physical objects in real-time, to safely guide real-world roaming within an unfamiliar (e.g., not pre-scanned or modeled) or dynamic physical environment. In other words, various embodiments disclosed herein can track a user's physical environment to facilitate on-the-fly virtual scene adaptation to keep the user safe from collisions, while maintaining thematic consistency with the virtual environment. More specifically, a computing device coupled to a head-mounted display (HMD) receives sensor data from a plurality of sensors. Among other things, the sensors generate sensor data that includes, for instance, depth map data and image data associated with the surrounding physical environment. The depth map data is employed by the computing device to responsively generate a geometric representation of the surrounding physical environment and the physical objects located therein. Among other things, the computing device can segment the generated geometric representation, such that each portion of the geometric representation (each of which can independently be referenced as a geometric representation) corresponds to a physical object located within the physical environment and detected based on the received sensor data.

In some embodiments, the computing device can composite any one or more of the generated geometric representations into a virtual environment, such as one stored and renderable by the computing device. In this regard, a realistic computer-generated representation of a physical object can be perceived within the virtual environment when rendered and provided for display to the HMD. Physical objects, such as those that could be potentially hazardous to a user moving about a physical environment while fully-immersed in the virtual environment, can be effectively perceived as virtual objects by a user of the HMD. In some aspects, any portion of the received image data can be selectively passed-through, to provide for display of the selected portion of the image data to the HMD. In effect, some embodiments can provide pass-through visibility (i.e., as image data) of a corresponding portion of the physical environment. In this way, physical objects can be avoided or physically interacted with based on the facilitated perception thereof, either through generated virtual representations (e.g., virtual objects) or pass-through image data.

In some embodiments, the computing device can dynamically select a generated geometric representation for compositing into the stored virtual environment based on determinable characteristics thereof, such as geometric features or shapes, distance (e.g., relative to the HMD), proximity to another geometric representation (e.g., distance(s) between two or geometric representations), motion, or visual classification, among other things. In some further embodiments, the computing device can dynamically select a generated geometric representation for compositing based on temporal aspects. For instance, a particular stage of a video game associated with the virtual environment, a particular location of a scene in the virtual environment, or a particular timeframe of a timeline associated with the virtual environment, each can trigger the selection of one or more generated geometric representations for compositing within the virtual environment.

In some embodiments, the computing device can blend the virtual environment with the selected one or more generated geometric representations to facilitate a more realistic composition thereof. As one of ordinary skill may appreciate, the compositing of the selected one or more generated geometric representations to a virtual environment may contrast (e.g., visually) with a theme or design associated with the virtual environment. As such, it may be desirable to apply any combination of blending mechanisms between the virtual environment and/or the selected one or more generated representations, to maintain realism or thematic consistency with the virtual environment.

In some further embodiments, the computing device can extract texture and/or color from received image data to texturize or color a generated geometric representation. In this way, a portion of the geometric representation can be composited within the stored virtual environment and rendered as a realistic, computer-generated depiction, of the corresponding physical object. In some further embodiments, visual aspects (e.g., color information) of the stored virtual environment can be determined and employed to modify (e.g., colorize) the selected portion(s) of the geometric representation, so that when composited with the stored virtual environment, thematic consistency between the selected portion(s) and the stored virtual environment can be maintained. By way of example, a stored virtual environment depicting a virtual sunset can present a variety of virtual objects or elements influenced with an orange hue, a color that corresponds to the light source (e.g., the virtual sun) depicted in the stored virtual environment. In this regard, the computing device can determine the hue, and modify the color(s) of the selected portion(s) of the geometric representation, such that the selected portion(s) appear thematically consistent with the virtual environment (e.g., sunset) in which they are composited.

In some further embodiments, the computing device can selectively present one or more portions of the received image data via the HMD utilizing a pass-through effect, whereby the one or more portions are displayed without the use of geometric representations (i.e., as they would be perceived in the physical environment). That is, in some embodiments, a user utilizing the HMD can perceive the virtual environment, and one or more portions of the image data received via the sensors can be selectively presented through or in conjunction with the virtual environment. In some aspects, the one or more portions can be selected based on received input(s) (e.g., an input manually provided to the computing device via a controller), a detected motion of a physical object in the physical environment, or a set of detected features of the physical object (e.g., object or facial recognition), among other things. In this regard, the computing device can provide selective pass-through of received image data, such that certain areas of a physical environment, or particular physical objects within the physical environment, can be selectively provided for display by the computing device via the HMD.

In various embodiments, a virtual environment rendered and provided for display via a HMD can be dynamically modified to include one or more geometric representations of physical objects detected in a user's physical environment. The one or more geometric representations can be automatically selected for compositing within the virtual environment, and dynamically blended with the virtual environment to facilitate a maintained realism. Among other things, one or more portions of received image data associated with the physical environment can be selectively passed-through the rendering process and provided for display to the HMD. In this way, a user wearing the HMD can safely traverse (e.g., roam, walk about) a physical environment, while the computing device dynamically blends geometric representations of physical objects detected in the physical environment with a virtual environment perceived by the user.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a head-mounted display (HMD) coupled to a set of sensors, such as HMD 110 and sensor(s) 120a, 120b. The HMD 110 can include a stereoscopic display to facilitate a stereoscopic presentation of three-dimensional virtual environments and virtual objects that can be perceived by a user wearing the HMD 110. The HMD 110 can be coupled to a reality blending device 115, which can be integrated into a body of the HMD 110, separate from the HMD 110 but physically coupled thereto, or wirelessly coupled to the HMD 110, to facilitate physical roaming about a physical environment while fully-immersed in a blended virtual environment (i.e., a virtual environment composited with visual representations of physical objects detected within the physical environment). In some aspects, the reality blending device 115 coupled to the HMD 110 can include a portable computing device, e.g., one that is carried or worn on the person of a user wearing the HMD 110.

In various embodiments, the set of sensors can include tracking sensors 120a (e.g., rotational tracking sensors, positional tracking sensors) that can generate sensor data employable by the reality blending device 115 to determine a physical orientation of the HMD 110 and a physical position of the HMD 110 relative to the physical environment around it. In a preferred embodiment, the tracking sensors 120a are inside-out sensors, which include sensors that are secured to a body of the HMD 110. However, it is contemplated that a variety of sensors, including outside-in sensors, can be employed to facilitate the determination of, among other things, a physical orientation and/or physical position of the HMD 110.

In various embodiments, the set of sensors can further include a set of environmental sensors 120b (e.g., acoustic sensors for sonar, radio wave sensors for radar, optical sensors) employable to receive environmental data (e.g., acoustic data, radio wave data, optical data) from the surrounding physical environment and determine, among other things, distances or other characteristics of physical objects within a tracking area (e.g., field of view, range of detection) of the environmental sensor. In some aspects, environmental data can include a depth map or other three-dimensional mesh, from which distances or other characteristics of physical objects within the tracking area can be determined. By way of non-limiting example, the Microsoft Kinect® device is one exemplary environmental sensor (e.g., a depth map sensor or RGBD camera) that can continuously generate a real-time depth map for each frame of optical input information received thereby. In this regard, the reality blending device 115 can receive each depth map frame generated by the environmental sensor to determine, among other things, distances, shapes, relative movements, or other physical characteristics of physical objects within the tracking area (e.g., field of view). In some further embodiments, the set of environmental sensors 120b can include an optical sensor (e.g., a camera) that can generate image data based on light received from the surrounding physical environment. Among other things, the optical sensor can generate image data that represents the visual aspects (e.g., color, shape, texture) of the physical environment within its field of view.

In some aspects, an environmental sensor can also be employed by the reality blending device 115 as a positional tracking sensor, by determining that a position of the HMD is moving relative to the physical environment being tracked by the environmental sensor. In a preferred embodiment, the set of environmental sensors 120b are inside-out sensors, which include sensor(s) that are secured to a body of the HMD 110. In some aspects, the set of environmental sensors is rigidly mounted to the HMD 110, aimed at a parallel view direction to the HMD 110. However, it is contemplated that a variety of sensors, including outside-in sensors, can be employed to facilitate the determination of, among other things, distances (e.g., relative to the HMD 110) or other characteristics (e.g., visual) of physical objects within corresponding tracking area(s) of the environmental sensor(s) 120b.

While not shown, in some further embodiments, the set of sensors can further include a set of location sensors, such as a GPS receiver, employable to determine physical location data (e.g., location coordinates from a satellite or other source) that corresponds to a physical location of the GPS receiver. In some alternative embodiments, the set of location sensors can include Wi-Fi radios, Bluetooth radios, telecommunications radios, or any other transceiver that can be triangulated based on signals or characteristics thereof (e.g., signal strength, signal sources) received from source transmitters (e.g., Wi-Fi access points, Bluetooth beacons, telecommunications towers) within a detectable range of the set of location sensors. In various embodiments, the reality blending device 115 can receive sensor data from one or more location sensors to determine, among other things, physical location coordinates of the sensor(s) (and thereby the user wearing the HMD 110), whether through receiving coordinates or triangulating an approximate location based on the received source signals, among other things. The reality blending device 115 can employ the user's location coordinates to determine where the user is physically located relative to static physical obstructions that are depicted on an electronic map (e.g., a bird's eye perspective map), by way of example. It is contemplated that an electronic map can be stored locally in a memory of the reality blending device 115, or can be accessed or retrieved utilizing a third-party mapping service via a network.

In some embodiments, the third-party mapping service can be hosted by a remote server device, such as server device 140. The server device 140 can be accessed by the reality blending device 115 via a network 130, which can include a LAN, WAN, PAN, or the Internet, by way of example. The server device 140 can be coupled to a database 80 that can store, among other things, electronic map(s) or any other electronic data that can be accessed and/or retrieved by the reality blending device 115. In some embodiments, location coordinates determined by the reality blending device 115 can be communicated to the server device 140, causing the server device 140 to provide the reality blending device 115 with an electronic map determined relevant to the location coordinates and/or a depiction of the received location coordinates on the determined relevant map, among other things. In some aspects, the server device 140 and database 80 can serve as a data storage device for facilitating the transfer of data to and from the reality blending device 115, among other things.

Figure 2:
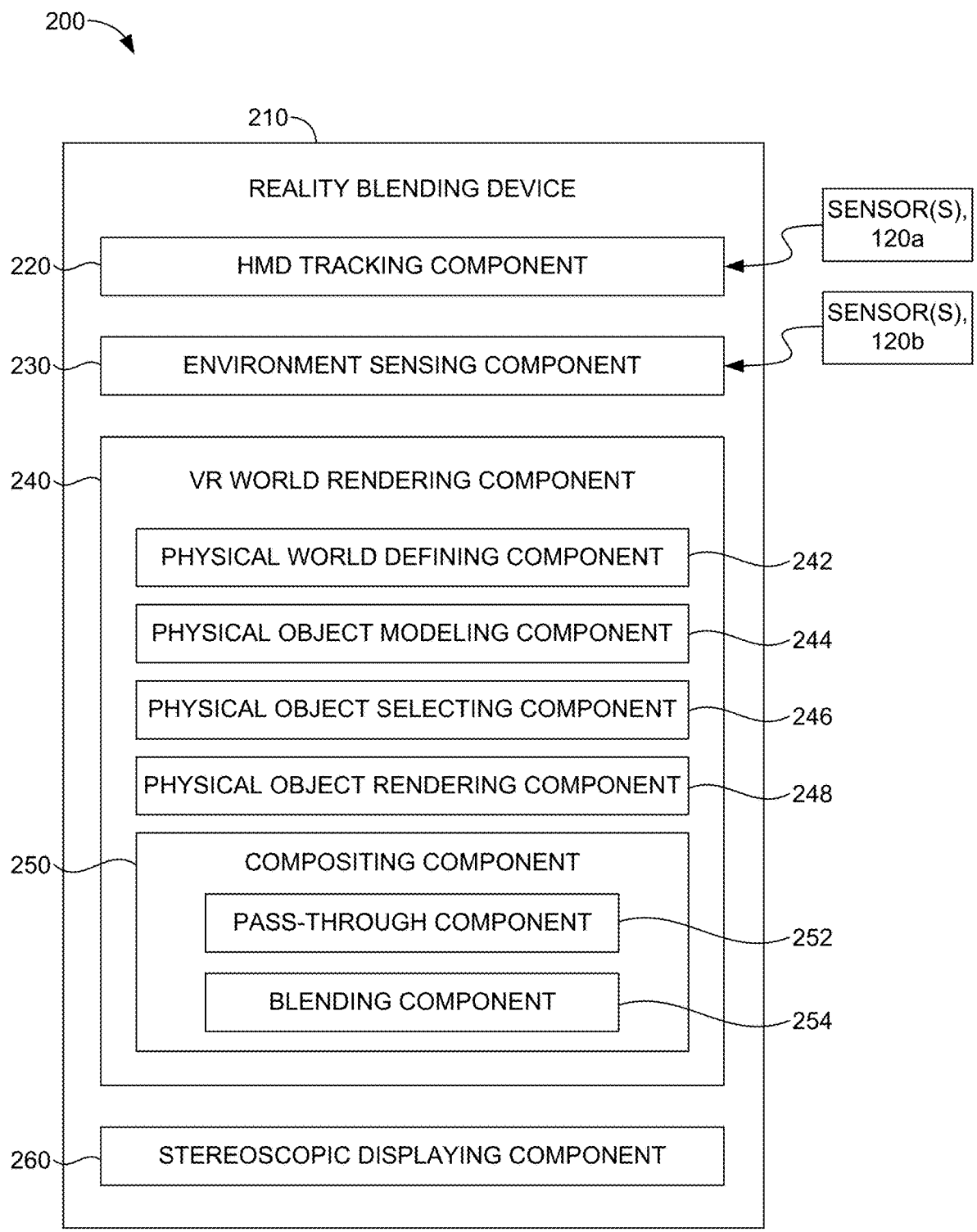
FIG. 2 is a block diagram of an exemplary reality blending device for rendering and compositing a virtual environment with dynamically generated virtual objects on-the-fly, in accordance with some embodiments of the present disclosure.

Turning now to FIG. 2, a block diagram 200 is provided, illustrating an exemplary reality blending device 210, such as reality blending device 115 of FIG. 1, for dynamically rendering and compositing a fully-immersive virtual environment with virtual objects generated in real-time based on received sensor data. A reality blending device 210 provided in accordance with some described embodiments, in an example, can safely guide real-world roaming within an unfamiliar (e.g., not pre-scanned or modeled) or dynamic physical environment, while providing the ability to perceive realistic virtual objects representative of detected physical objects, among other things. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The reality blending device 210 is an example of a suitable architecture for implementing certain aspects of the present disclosure. It should be understood that any number of user devices, hardware, modules, or components within the scope of the present disclosure can be employed to perform the functions described in associated with the reality blending device 210. In some embodiments, the reality blending device 210 can include a computing device, such as the computing device 800 described in relation to FIG. 8 herein. As each of the described components are depicted as being included in the reality blending device 210, it is contemplated that any component depicted therein is not limited to the illustrated embodiment, and can be distributed among a plurality of computing devices, modules, or hardware devices, or in some instances, may be conflated into a single hardware device or module, such as a processor or hardware device. It is also contemplated that any one or more of the described components can be completely removed from the reality blending device 210, so long as one or more operations described in correspondence to a removed component can be compensated for by one or more other components, or a third-party resource, remote computing device, or hardware device, among other things.

In some embodiments, the reality blending device 210 can be coupled to head-mounted display (HMD), such as HMD 110 of FIG. 1. The reality blending device 210 can also be coupled to a set of sensors, such as tracking sensor(s) 120*a* and environmental sensor(s) 120*b*. As briefly described in relation to FIG. 1, any one or more of the tracking sensor(s) 120*a* and/or environmental sensor(s) 120*b* can be integrated into or rigidly secured to the HMD in accordance with some embodiments.

The reality blending device 210 can include a HMD tracking component 220 that receives tracking sensor data from the tracking sensor(s) 120*a*. The HMD tracking component 220 can determine, among other things, an orientation of the HMD based on the received tracking sensor data. The tracking sensor data can include electronic information that corresponds to a detected pitch, yaw, or roll of the HMD, among other things. In various embodiments, the tracking sensor(s) 120*a* can include an accelerometer, a gyroscope, a magnetometer, and other sensors for measuring cardinal direction, linear acceleration, and/or angular velocity of the HMD, among other inertial characteristics of the HMD.

In some further embodiments, the HMD tracking component 220 can determine a position of the HMD in space (i.e., the physical environment) based on the received tracking sensor data. In this regard, the tracking sensor data can further include electronic information that corresponds to determined movements of the HMD in space, including forward/backward, up/down, and left/right movements of the HMD. In various embodiments, such tracking sensor(s) 120*a* can further include acoustic tracking sensors, optical sensors (e.g., utilizing passive and/or active markers, visible markers, non-existent markers, depth maps, or a combination thereof), QR tracking systems, cameras, or other sensors for tracking movements of the HMD in space.

In some further embodiments, the reality blending device 210 can include an environment sensing component 230 that receives environmental sensor data from the environmental sensor(s) 120*b*. The environment sensing component 230 can determine, among other things, relative distances, shapes, and/or locations of physical objects in a tracking area (e.g., field of view) of the environmental sensor(s) 120*b* based on the received environmental sensor data. In some embodiments, the environmental sensor data can be received as individual frames (e.g., depth map frames) generated based on received optical information. The environmental sensor data (e.g., each frame) can include electronic information (e.g., depth map) that corresponds to one or more physical objects (e.g., ground, walls, people, animals, chairs, tables, plants, or any physical structure) detected within the field of view of environmental sensor(s) 120*b* at any given time. In some embodiments, environmental sensor(s) 120*b* can include, for instance, a depth map sensor or RGBD sensor. In various embodiments, environmental sensor(s) 120*b* can continuously receive optical information (e.g., images) from the physical environment and responsively (e.g., periodically) generate frames (e.g., depth maps) that correspond to the received optical information. In some aspects, the optical information can include image data, such as RGB images, that depict the physical environment within the sensor field of view. The environment sensing component 230 can determine, for each generated frame, relative distances, shapes, and/or locations of physical objects in a tracking area (e.g., field of view) of the environmental sensor(s) 120*b* in response to receiving the generated frame. In some further embodiments, the environment sensing component 230 can receive image data associated with each frame, which depicts the visual image associated with the captured frame. By way of a non-limiting example, Microsoft's Kinect device can be employed as a depth map camera. In some aspects, the environment sensing component 230 can receive both depth map frames and image data frames from one or more environmental sensors 120*b*. In some embodiments, a tracking sensor 120*a* can also operate as an environmental sensor 120*b*, or vice versa, such that the sensor data generated thereby can be employed by HMD tracking component 220 and/or environment sensing component 230 to both track movement of the HMD in space and determine relative distances, shapes, and/or locations of physical objects in a tracking area.

In some embodiments, the environment sensing component 230 can determine, among other things, that a physical object or "obstruction" is present in the tracking area of the environmental sensor(s) 120*b* based on the received environmental sensor data. In some aspects, the environment sensing component 230 can operate under an assumption that the physical environment in which the user is roaming has a flat planar ground, such that physical objects can be detected based on a determination that physical objects depicted in generated sensor data (e.g., environmental data) appear taller than the ground. However, in some embodiments, the foregoing assumption can be avoided by identifying certain physical objects (e.g., steps, curbs, ramps) that can be accounted for (e.g., utilizing visual recognition techniques) when making a determination on whether a physical object is an obstruction or a navigable area or pathway (e.g., flat planar ground, steps, curbs, ramps).

The reality blending device 210 can further include a VR world rendering component 240. In various embodiments, the VR world rendering component 240 can generate a virtual environment or any portion thereof (e.g., a virtual scene or a portion of the virtual environment) that can be provided for display to a HMD, such as HMD 110 of FIG. 1, such that at least the portion of the virtual environment can be perceived by a user wearing the HMD. In some embodiments, the VR world rendering component 240 can generate the virtual environment, including virtual objects, any of which can correspond to physical objects detected within the user's surrounding physical environment based at least in part on one or more pieces of environmental sensor data (e.g., depth map frames) received via environment sensing component 230. In some further embodiments, the VR world rendering component 240 can generate virtual objects corresponding to detected physical objects based further on the received image data. In this regard, a virtual object can be rendered to maintain the visual characteristics of a corresponding physical object, as it would be perceived in the physical environment. More specifically, the shape of a generated virtual object can correspond to the shape of a detected physical object based on a corresponding portion of a received depth map frame, while the color and texture of the generated virtual object can correspond to the color and/or texture of the detected physical object based on a corresponding portion of a received image data frame, among other things.

The VR world rendering component 240 can include a physical world defining component 242 that can receive a piece of environmental sensor data (e.g., a depth map frame) and generate a map or grid of the user's surrounding physical environment. That is, the depth map frame can include a grid that depicts relative distances, proximities, heights, shapes, and other visual features of the physical environment captured within the frame.

The VR world rendering component 240 can further include a physical object modeling component 244 that can determine that one or more portions of the received depth map frame corresponds to a particular type of structure or object. For instance, in some embodiments, the physical object modeling component 244 can determine that one or more portions of a depth map frame corresponds to a floor or flat surface (e.g., having a baseline height or relative height of zero) of the physical environment on which the user can roam. In some embodiments, the physical object modeling component 244 can determine that one or more portions of the depth map frame corresponds to one or more walls (e.g., walls of a room) of the physical environment, that is, the one or more portions of the depth map frame corresponds to a physical structure that connects the determined floor portion to a determined ceiling portion, or extends to a height above a defined height threshold, by way of example. In some embodiments, the physical object modeling component 244 can determine that one or more portions of the depth map frame corresponds to a physical object or obstruction within the physical environment, that is, the one or more portions of the depth map frame corresponds to a physical structure that has a height taller than the determined floor portion, but is not necessarily a wall, or does not extend beyond the defined height threshold, by way of example. The foregoing examples are not intended to be limiting, as it is contemplated that a variety of determinations described or not described herein can be made as corresponding to a portion of a depth map frame, e.g., a wall can also or alternatively be determined as a physical object or obstruction.

In some embodiments, the physical object modeling component 244 can associate one or more portions of the depth map frame with a tag or label, such that certain portions of the depth map frame can be identified by the reality blending device 210 as the particular type of structure or object, such as a floor or navigable area, a wall, a ceiling, or other physical object or obstruction, by way of example. In this way, the physical object modeling component 244 can segment each tagged portion of the depth map frame into geometric representations that each correspond to a portion of the physical environment represented by the received depth map frame. By way of example, a user may be standing in a room whereby a couch, table, and three walls are visible from the user's perspective and a depth map sensor. The depth map sensor can generate a depth map frame from the user's perspective, from which the physical world defining component 242 can receive the depth map frame. The physical object modeling component 244 can analyze the depth map frame to segment the depth map frame into geometric representations, such that a geometric representation for each of the couch, the table, and the walls is generated.

In accordance with various embodiments, the VR world rendering component 240 can render and provide for display a virtual environment, such as one stored in a memory of the reality blending device 210. The VR world rendering component 240 can dynamically adjust, transform, and/or move the virtual environment and/or virtual objects therein based on tracking sensor data received by HMD tracking component 220 from the tracking sensor(s) 120*a* and/or environmental sensor data received by environment sensing component 230 from the environmental sensor(s) 120*b*, such that movements made by the user within the physical environment are translated into perceived movements within the virtual environment. In various embodiments, the virtual environment and/or virtual objects can be provided for stereoscopic display via a stereoscopic displaying component 260 of the reality blending device 210.

In order to facilitate a compositing of virtual objects generated based on one or more of the generated geometric representations into the virtual environment, a physical object selecting component 246 can dynamically select one or more of the generated geometric representations based on one or more determined characteristics thereof. Based on determined characteristics of a physical object corresponding to a generated geometric representation, or similarly, based on determined characteristics of a generated geometric representation corresponding to a detected physical object, the physical object selecting component 246 can select the generated geometric representation to be rendered and composited into the virtual environment. In some other embodiments, the physical object selecting component 246 can select the generated geometric representation in an inverse manner, that is, the selection can indicate that the selected geometric representation is not to be rendered and composited into the virtual environment. In some other embodiments, the physical object selecting component 246 can select the generated geometric representation for providing pass-through image data that corresponds to the geometric representation. In other words, the selection can indicate that the corresponding image data should be provided for display without compositing into the virtual environment.

In some aspects, the physical object selecting component 246 can dynamically select a generated geometric representation for rendering and compo siting into the virtual environment based on a distance of the corresponding physical object relative to the user (e.g., the HMD or a depth map sensor). In some embodiments, the distance can be determined based on the position of the geometric representation corresponding to the physical object within the depth map frame. In some aspects, a threshold distance can be defined, such that physical objects, and thereby the corresponding geometric representation, determined to be equal to or less than the threshold distance (e.g., relative to the HMD or depth map sensor) can be selected for rendering and compositing within the virtual environment.

In some other aspects, the physical object selecting component 246 can dynamically select a generated geometric representation for rendering and compositing into the virtual environment based on a proximity of the corresponding physical object relative to another generated geometric representation. In some embodiments, the proximity can be determined based on the position of the geometric representation corresponding to the physical object within the depth map frame relative to the position of another geometric representation corresponding to another physical object within the depth map frame. In some aspects, a threshold proximity can be defined, such that physical objects, and thereby the corresponding geometric representation, determined to be at or within the threshold proximity can be selected for rendering and compositing within the virtual environment.

In some other aspects, the physical object selecting component 246 can dynamically select a generated geometric representation for rendering and compositing into the virtual environment based on a motion of the corresponding physical object. In some embodiments, the motion can be detected based on a determination that a particular geometric representation corresponding to a physical object, from two or more compared depth map frames, is different (e.g., different relative position, modified shape). In this regard, the motion of a physical object can be determined by the physical object selecting component 246 based on a comparison of two or more depth map frames. It is contemplated that a variety of techniques for detecting motion of a physical object can be employed, and that the described embodiments are not intended to be limiting in any way.

In some other aspects, the physical object selecting component 246 can dynamically select a generated geometric representation for rendering and compositing into the virtual environment based on a visual classification of the corresponding physical object. In some embodiments, the visual classification can be determined from characteristics of the geometric representation, or determined from the image data corresponding to the geometric representation. That is, in some embodiments, the physical object selecting component 246 can determine that a geometric representation corresponding to a physical object includes visual features that correspond (e.g., have a threshold similarity) to a known physical object. It is contemplated that a variety of machine learning or visual classification techniques can be employed to determine the visual classification of a geometric representation or its corresponding physical object.

In some other aspects, the physical object selecting component 246 can dynamically select a generated geometric representation for rendering and compositing into the virtual environment based on a virtual location of the user within the virtual environment. By way of example, a user playing a virtual game associated with a virtual environment may reach a stage, timeframe, or virtual location of the virtual game, where a simulated acceleration or velocity of the user is presented (e.g., the user is riding in a virtual vehicle). In this regard, it may appear awkward to concurrently display a composite of geometric representations corresponding to physical objects that are far away (e.g., greater than a threshold distance) from the user. However, geometric representations of physical objects that are close (e.g., less than the threshold distance) can be selected and concurrently displayed to provide a physical frame of reference, e.g., to reduce motion sickness. Similarly, in another aspect, when reaching a stage, timeframe, or virtual location of the virtual game, the physical object selecting component 246 can select one or more generated geometric representations based on relative location, proximity, features, or any combination of the determinable visual characteristics described herein.

In some other aspects, the physical object selecting component 246 can dynamically select a generated geometric representation for rendering and compositing into the virtual environment based on an input received from a remote device, such as a remote controller, remote computing device, or remote HMD associated with another user, any of which are sharing a collaborative virtual experience with the reality blending device 210 having physical object selecting component 246. That is, in some embodiments, the physical object selecting component 246 can receive, from a remote computing device or a remote controller, an input signal intended for receipt by the reality blending device 210. In some aspects, the input signal can be directed to coordinates or a location of the physical environment in which a user of the reality blending device 210 is in. In this way, the received input signal can direct the physical object selecting component 246 to select, based on a remote input signal, a geometric representation corresponding to the coordinates or location, or a physical object associated with the coordinates or location. It is further contemplated that such remotely-provided inputs can further be employed for remotely-initiating image pass-through coordinates, as will be described.

The foregoing aspects are provided herein as non-limiting examples of how the physical object selecting component 246 can select which particular physical objects, in the user's physical environment, can be perceived (e.g., virtually or as image data) while fully-immersed in the virtual environment. It is contemplated that such techniques of selection are not mutually exclusive, and can be employed independently or in any combination with one another. As described herein, the physical object or its corresponding geometric representation can be selected for compositing or not compositing (e.g., a negative selection or removal from a blanket selection), depending on various implementations. Further, it is contemplated that the physical object or its corresponding geometric representation can be selected for pass-through viewing via the HMD, such that the image data corresponding to the physical object is provided for display.

It is also contemplated that pass-through image data can be displayed, preferably as an overlay, in conjunction with the virtual environment and/or virtual objects.

In some embodiments, the VR world rendering component 240 further includes a physical object rendering component 248 that renders one or more geometric representations of corresponding physical objects into virtual objects. The one or more geometric representations rendered by the physical object rendering component 248 can be selected for rendering, by the physical object selecting component 246, by way of example. In some aspects, the physical object rendering component 248 can employ a selected geometric representation as a three-dimensional model from which a virtual object is rendered. In some further aspects, the physical object rendering component 248 can extract a portion of the received image data that corresponds to the selected geometric representation, and apply the portion of image data to the geometric representation. In this regard, the physical object rendering component 248 can generate a virtual object that includes visual characteristics of the corresponding physical object from which the virtual object was rendered. Having also received image data with a depth map frame from which a geometric representation was generated, the physical object rendering component 248 can generate a virtual object that has the same or similar colors, textures, or other visual characteristics of a corresponding physical object detected within the user's physical environment.

In some embodiments, the VR world rendering component 240 further includes a compositing component 250 that can, among other things, generate a composite (also referenced herein as a "composite virtual environment") of a virtual environment and virtual objects generated based on a user's physical environment, such as a virtual object generated by the physical object rendering component 248. The compositing component 250 can further provide for display the composite virtual environment to the stereoscopic displaying component 260.

In some aspects, the compositing component 250 can facilitate the pass-through of selected portions of received image data for display to the HMD. As described in accordance with the physical object selecting component 246, one or more selected geometric representations of physical objects can be selected for pass-through viewing. That is, the portion(s) of received image data corresponding to a selected geometric representation can be provided for display to the HMD based on or in response to the selection. It is contemplated that such selections can be made utilizing any of the described aspects of the physical object selecting component 246, and can further define whether certain selections are made based on a defined set of rules. By way of example, the physical object selecting component 246 can include a rule that selects a particular physical object (or its geometric representation) for pass-through if it is visually classified as a human or animal. The physical object selecting component 246 can analyze the image data corresponding to the particular physical object, determine that the image data corresponds to a human or animal, and select the physical object for pass-through viewing. As such, the compositing component 250 can include a pass-through component 252 that receives the corresponding image data, and provides the corresponding image data for display to the HMD. As described herein, the pass-through component 252 can provide for display the corresponding image data as an overlay to a composite virtual environment, among other things, via the stereoscopic displaying component 260.

In some embodiments, the pass-through component 252 can receive an input to select portions of received image data for pass-through display to the HMD. That is, apart from an automated selection, the pass-through component 252 can receive one or more inputs that define areas of received image data to be viewed by the user. In some aspects, the input can be received from a controller that is in paired communication with the reality blending device 210. The controller can include a hand-held controller, such as a virtual reality controller, or any other input device. In some aspects, and much like the HMD, the controller can generate tracking sensor data, such as electronic information corresponding to a detected pitch, yaw, or roll, of the controller. In some further aspects, a relative position of the controller (e.g., to the HMD, user, sensors) can also be tracked. In this regard, the controller can provide a "flashlight"-like tool, that similar to a flashlight, can provide improved visibility to the user. However, instead of emitting light, the "flashlight"-like tool can instead provide an input to the pass-through component 252, that makes a selection of received image data for pass-through display.

In some other aspects, the compositing component 250 can further include a blending component 254 that can blend a virtual environment with generated virtual objects (e.g., by physical object rendering component 248). As utilized herein, the term blend can include a modification to, or augmentation of, either one or both of the virtual environment or generated virtual object(s). As the compositing of random virtual objects into a virtual environment could take away from the user experience (e.g., realism or theme) of the virtual environment (e.g., appearance of random objects within virtual environment), the blending component 254 can employ a variety of blending techniques to generate a composite virtual environment, without detracting from the user experience.

Figure 3:
FIG. 3 depicts a variety of illustrations showing exemplary implementations for compositing a virtual environment and dynamically generated virtual objects or pass-through image data on-the-fly, in accordance with some embodiments of the present disclosure.

Looking now to FIG. 3, a set of illustrations 300 are provided to depict exemplary implementations of compositing a virtual environment and virtual objects or pass-through image data on-the-fly, in accordance with some embodiments of the present disclosure. As can be seen in the composited virtual environment presented in illustration 310, an exemplary visual image of what the user may perceive from his or her field of view while wearing a HMD (e.g., HMD 110 of FIG. 1) coupled to a reality blending device (e.g., reality blending device 210 of FIG. 2) is provided, as described in some embodiments of the present disclosure. The illustration 310 presents an example of some implementations where a blending component (e.g., blending component 254 of FIG. 2) of the reality blending device employs an alpha blending mechanism for blending the virtual environment with one or more virtual objects. As described herein, any one or more of the virtual objects can be generated based on physical objects detected within the user's physical environment and selected for generation and compositing based on one or more predefined selection rules (e.g., relative distance, features, visual characteristics).

As can be seen in the composited virtual environment presented in illustration 320, another exemplary visual image of what the user may perceive from his or her field of view while wearing a HMD (e.g., HMD 110 of FIG. 1) coupled to a reality blending device (e.g., reality blending device 210 of FIG. 2) is provided, as described in some embodiments of the present disclosure. The illustration 320 presents an example of some implementations where a physical object selecting component (e.g., physical object selecting component 246) selects geometric representations corresponding to salient physical objects within the physical environment. In other words, in some embodiments, a salient object can be determined for selection by the reality blending device based on one or more tags associated with a geometric representation segmented by a physical object modeling component of the reality blending device, such as the physical object modeling component 244 of FIG. 2. In this regard, and in accordance with some embodiments, the physical object modeling component can determine whether physical objects corresponding to geometric representations correspond to salient objects (e.g., objects independent of the physical environments structure, such as floor, walls, ceiling). To this end, the physical object selecting component 246 can select the determined salient objects for generating virtual objects therefrom, and for compositing within the virtual environment, as described herein. Similarly, as can be seen in the composited virtual environment presented in illustration 330, another exemplary visual image of what the user may perceive from his or her field of view while wearing a HMD (e.g., HMD 110 of FIG. 1) coupled to a reality blending device (e.g., reality blending device 210 of FIG. 2) is provided, as described in some embodiments of the present disclosure. The illustration 330 presents another example of some implementations where a physical object selecting component (e.g., physical object selecting component 246) selects all geometric representations corresponding to all detected physical objects within the physical environment. In other words, all physical objects can be selected by the reality blending device for generating virtual objects therefrom, and for compositing within the virtual environment, as described herein, or for generating an entirely new virtual environment therefrom (e.g., independent of another stored virtual environment).

Further, presented in the composited virtual environment of illustration 340, an exemplary visual image of what the user may perceive from his or her field of view while wearing a HMD (e.g., HMD 110 of FIG. 1) coupled to a reality blending device (e.g., reality blending device 210 of FIG. 2) is provided, as described in some embodiments of the present disclosure. The illustration 340 presents an example of some implementations where a blending component (e.g., blending component 254 of FIG. 2) of the reality blending device employs a texture abstraction mechanism for blending the virtual environment with one or more virtual objects. More specifically, the reality blending device can, instead of applying the image data to selected geometric representations, generate mesh outlines for each selected geometric representation, and provide the mesh outline of each selected geometric representation for compositing within the virtual environment. In this way, a user can perceive abstract textures corresponding to detected physical objects in the physical environment, so that he or she can avoid the physical objects while remaining fully-immersed in the composited virtual environment. In some similar implementations, and as presented in illustration 350, the blending component can employ a polygon manipulating mechanism for blending the virtual environment with one or more virtual objects. More specifically, the reality blending device can, instead of applying the image data to selected geometric representations, generate floating polygons for each selected geometric representation, and provide the floating polygons generated for each selected geometric representation for compositing within the virtual environment. In this way, the user can perceive floating polygons corresponding to detected physical objects in the physical environment, so that he or she can avoid the physical objects while remaining fully-immersed in the composited virtual environment.

Presented in the composited virtual environment of illustration 360, an exemplary visual image of what the user may perceive from his or her field of view while wearing a HMD (e.g., HMD 110 of FIG. 1) coupled to a reality blending device (e.g., reality blending device 210 of FIG. 2) is provided, as described in some embodiments of the present disclosure. The illustration 360 presents an example of some implementations where a physical object selecting component (e.g., physical object selecting component 246) can determine when geometric representations corresponding to physical objects within the physical environment are within a threshold distance (e.g., to avoid collisions therewith). In other words, in some embodiments, a geometric representation can be selected for rendering and/or compositing by the reality blending device based on a determination that the corresponding physical object is within the threshold distance. In some other embodiments, based on the determination that the corresponding physical object is within the threshold distance, the reality blending device can selectively pass-through the image data corresponding to the selected geometric representation (e.g., via pass-through component 252). In this way, the reality blending device can actively provide for display a geometric representation, virtual object, or image data corresponding to the geometric representation based on a determination that the corresponding physical object is within a threshold distance of the user (e.g., the HMD or a depth map sensor).

As can be seen in the composited virtual environment presented in illustration 370, another exemplary visual image of what the user may perceive from his or her field of view while wearing a HMD (e.g., HMD 110 of FIG. 1) coupled to a reality blending device (e.g., reality blending device 210 of FIG. 2) is provided, as described in some embodiments of the present disclosure. The illustration 370 presents an example of some implementations where a physical object selecting component (e.g., physical object selecting component 246) selects geometric representations corresponding to non-salient physical objects (e.g., walls, ceiling, floor) within the physical environment. In other words, in some embodiments, a non-salient object can be determined for erasing or removal by the reality blending device based on one or more tags associated with a geometric representation segmented by a physical object modeling component of the reality blending device, such as physical object modeling component 244 of FIG. 2. In this regard, and in accordance with some embodiments, the physical object modeling component can determine whether physical objects corresponding to geometric representations correspond to non-salient objects. To this end, the physical object selecting component 246 can either select the determined non-salient objects (e.g., the corresponding geometric representations) for erasure or removal, or not select the determined non-salient objects for generating virtual objects therefrom for compositing into a virtual environment, as described herein.

Presented in the composited virtual environment of illustration 380, an exemplary visual image of what the user may perceive from his or her field of view while wearing a HMD (e.g., HMD 110 of FIG. 1) coupled to a reality blending device (e.g., reality blending device 210 of FIG. 2) is provided, as described in some embodiments of the present disclosure. The illustration 380 presents an example of some implementations where a pass-through component (e.g., pass-through component 252) can receive one or more inputs from an input device (e.g., a controller). As was described in accordance with pass-through component 252, the reality blending device can receive an input that defines its relative location (e.g., coordinates) within a tracking area of a set of sensors, which can include tracking sensors and/or environmental sensors. The input can be received from a controller that is in paired communication with the reality blending device, whereby the controller can generate tracking sensor data, such as electronic information corresponding to a detected pitch, yaw, or roll, of the controller. In some further aspects, a relative position of the controller (e.g., to the HMD, user, tracking and/or environmental sensors) can also be tracked. In this regard, the controller can operate as a "flashlight"-like tool, where the pass-through component can receive the input and project an area of received image data that corresponds to the input. In some aspects, the projected area can be placed at a defined distance in front of the received input, to provide a more "flashlight"-like experience. In this regard, the reality blending device can provide the user with selective visibility (e.g., utilizing select portions of pass-through image data) of his or her physical environment.

Figure 4:
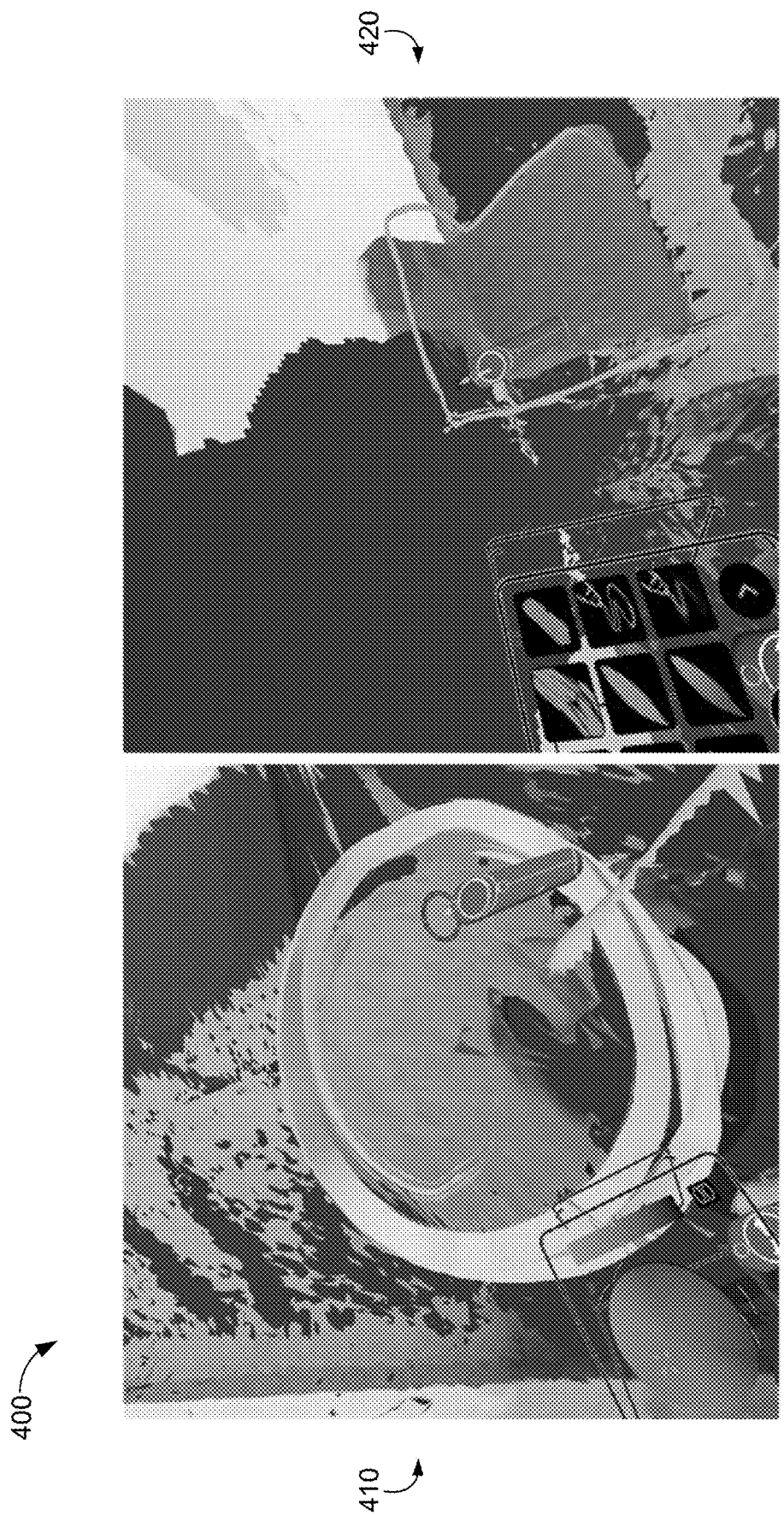
FIG. 4 depicts a variety of illustrations showing further exemplary implementations for compositing a virtual environment and dynamically generated virtual objects or pass-through image data on-the-fly, in accordance with some embodiments of the present disclosure.

Looking now to FIG. 4, a set of illustrations 400 is provided to depict exemplary implementations of compositing a virtual environment and virtual objects generated based on physical objects detected within the physical environment on-the-fly, in accordance with some embodiments of the present disclosure. As can be seen in the composited virtual environment presented in illustration 410, an exemplary visual image of what the user may perceive from his or her field of view while wearing a HMD (e.g., HMD 110 of FIG. 1) coupled to a reality blending device (e.g., reality blending device 210 of FIG. 2) is provided, as described in some embodiments of the present disclosure. The illustrations 410, 420 present examples of some implementations where all available geometry of the physical environment (e.g., the entire depth map frame or all geometric representations therein) can be employed to generate virtual objects that are composited into a virtual environment, similar to the example depicted in illustration 330 of FIG. 3. By employing various embodiments of the present disclosure, certain virtual reality applications (e.g., productivity applications) can benefit from implementations where the entire physical environment or representations thereof are composited with the virtual environment. For instance, illustration 410 presents an example where an ottoman detected in the physical environment, and utilized to generate a corresponding virtual object that is composited into the virtual environment, can be employed as a visual guide for drawing (e.g., with a controller) a circle in the virtual environment. In another instance, illustration 420 presents an example where a chair detected in the physical environment, and utilized to generate a corresponding virtual object that is composited into the virtual environment, can be employed as a reference point for drawing in three-dimensional space (e.g., tilt-brush applications).

Figure 5:
FIG. 5 depicts a variety of illustrations showing even further exemplary implementations for compositing a virtual environment and dynamically generated virtual objects on-the-fly, in accordance with some embodiments of the present disclosure.

Looking now to FIG. 5, a set of illustrations 500 is provided to depict exemplary implementations of compositing a virtual environment and virtual objects generated based on physical objects detected within the physical environment on-the-fly, in accordance with some embodiments of the present disclosure. While the depicted illustrations of FIG. 5 are in black and white, it is contemplated that the virtual environment (e.g., ground, sky) is presented with a dark blue hue. As can be seen in the composited virtual environment presented in illustration 510, an exemplary visual image of what the user may perceive from his or her field of view while wearing a HMD (e.g., HMD 110 of FIG. 1) coupled to a reality blending device (e.g., reality blending device 210 of FIG. 2) is provided, as described in some embodiments of the present disclosure. The illustration 510 depicts virtual objects corresponding to detected physical objects composited into a virtual environment, the virtual environment having a dark blue color scheme. To facilitate a more realistic composition of the virtual environment and the generated virtual objects, the blending component 254 of FIG. 2 can employ a color transfer mechanism that applies a perceived light from the virtual environment to the generated virtual objects. By way of example, if a user enters a virtual cave having a dark bluish hue, as depicted by the darker environmental aspects (e.g., sky, ground) of virtual environment in illustration 510, it is contemplated that virtual objects (e.g., furniture) positioned therein should have a similarly dark bluish hue.

In this regard, in some embodiments, the blending component 254 can employ various techniques for modulating the color of the composited virtual objects to match that of the virtual environment, as depicted in illustration 520. To accomplish the foregoing, statistical methods utilizing parallel reduction techniques on a compute shader can be employed. In some embodiments, the blending component 254 can include or be in communication with the compute shader of the reality blending device. By way of example, in accordance with some embodiments, color statistics can be calculated in the CIEL*A*B* color space. In some embodiments, the global illumination ($\mu$) and standard deviation ($\sigma$) from a source image ($I_s$) are utilized to transform a target image ($I_t$) to match the distributions found in each L*A*B* color channel. Every pixel in $I_t$ can be scaled by a ratio between the standard deviation of the target ($\sigma_t$) and the standard deviation of the source ($\sigma_s$), providing:

$$I'_t = \frac{\sigma_t}{\sigma_s}(I_t - \mu_t) + \mu_s$$

The foregoing transformation can be implemented on the compute shader or the blending component 254 of FIG. 2, such that the virtual objects composited within the virtual environment can be effectively colored in a way that the virtual objects adopt the lighting depicted within the virtual environment.

Figure 6:
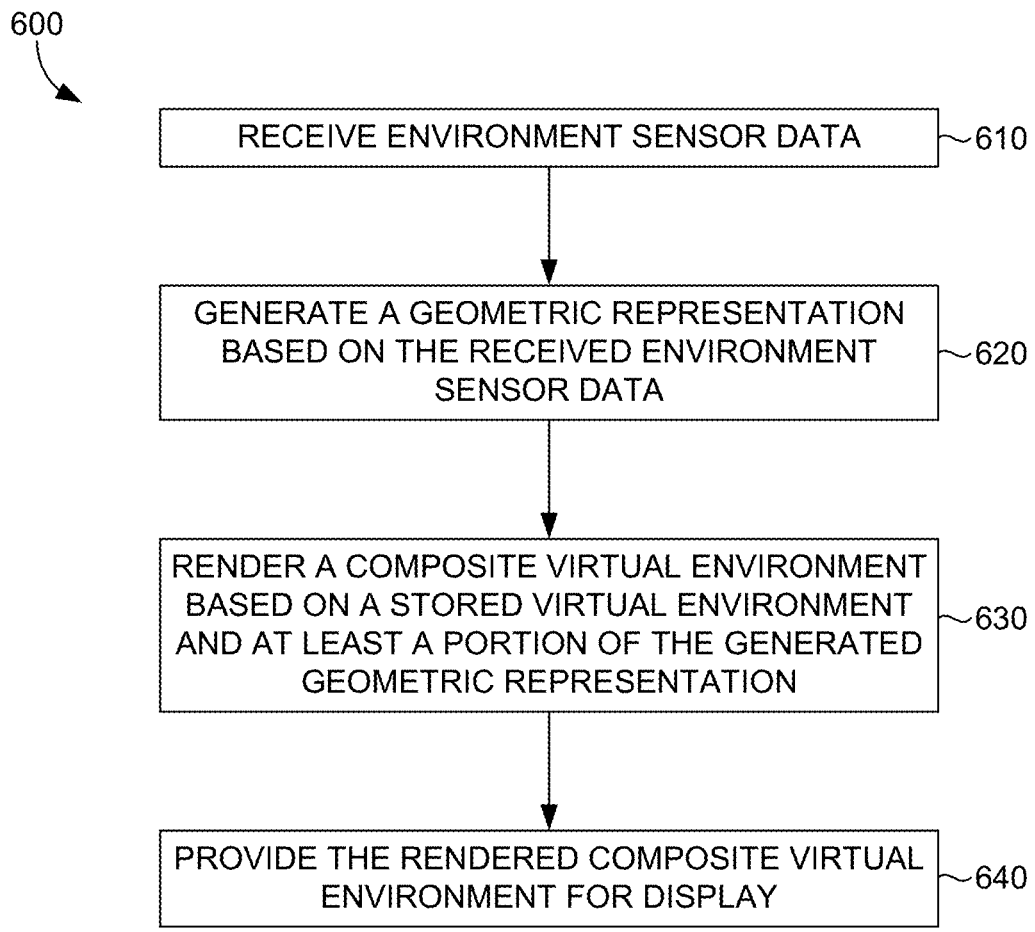
FIG. 6 is a flow chart depicting an exemplary process flow for rendering and compositing a virtual environment and dynamically generated virtual objects on-the-fly, in accordance with some embodiments of the present disclosure.

Having described various aspects of the present disclosure, exemplary methods are described below for dynamically rendering and compositing a virtual environment and dynamically generated virtual objects on-the-fly, in accordance with some embodiments. Referring to FIG. 6, a flow diagram is provided depicting a method 600 for dynamically rendering and updating a fully-immersive virtual environment in real-time. Each block of method 600 and other methods described herein comprises a computing process that may be performed using any combination of hardware, firmware, and/or software. For instance, various functions may be carried out by a module, hardware device, or processor executing instructions stored in memory. Various portions of the methods may also be embodied as computer-usable instructions stored on computer storage media.

In various embodiments, a head-mounted display (HMD) (e.g., HMD 110 of FIG. 1) is coupled to a computing device, such as reality blending device 115 of FIG. 1 or 210 of FIG. 2. In some embodiments, the HMD can be coupled to a set of tracking sensors, such as tracking sensors 120a of FIG. 1, and a set of environmental sensors, such as environmental sensors 120b of FIG. 1. In some embodiments, the environmental sensors 120b include acoustic and/or optical sensors that can generate, among other things, depth map frames and corresponding frames of image data, based on captured acoustic and/or optical information associated with a portion of the physical environment. In other words, the environmental sensors 120*b* can receive acoustic and/or optical information and generate, for any point in time, a depth map frame and a corresponding image data frame. In various embodiments, any one or more of the sensors can be rigidly fixed to the HMD or to a physical structure of the user's physical environment. Initially, at block 610, the computing device can receive environmental sensor data from the set of environmental sensors. It is contemplated that a user is wearing the HMD, such that the HMD is secured to the user's head and that the user can view a graphical output generated for display by the computing device to the HMD.

At block 620, the computing device can generate a geometric representation (e.g., a mesh) of at least a portion of the physical environment based on the received environment sensor data. For instance, a depth map frame received from at least one of the environmental sensors can be employed to generate the geometric representation of the physical environment or the portion thereof captured by the environmental sensors (e.g., within the field of view or tracking area). Among other things, the computing device can include a physical object modeling component, such as physical object modeling component 244 of FIG. 2, to segment portions of the generated geometric representation of the physical environment into individual generated geometric representations. The physical object modeling component can determine that one or more portions of the received depth map frame corresponds to a particular type of structure or object, based on a determined height, depth or relative distance, shape, or other characteristics thereof. In some embodiments, the physical object modeling component can further associate one or more portions of the depth map frame with a tag or label, such that certain portions of the depth map frame can be identified by the computing device as a particular type of structure or object, such as a floor or navigable area, a wall, a ceiling, or other physical object or obstruction, by way of example.

In some embodiments, the computing device can employ a physical object selecting component, such as physical object selecting component 246 of FIG. 2, to dynamically select one or more of the generated geometric representations based on one or more determined characteristics thereof. Based on determined characteristics of a physical object corresponding to a generated geometric representation, or similarly, based on determined characteristics of a generated geometric representation corresponding to a detected physical object, the physical object selecting component can select any one or more generated geometric representations to be rendered and composited into a virtual environment stored in a memory of the computing device. Among other things, determinable characteristics of a geometric representation or corresponding physical object can include relative depth or distance, motion, shape, visual classification, virtual position of the user within the virtual environment, or a stage/level within the virtual environment.

At block 630, the computing device can employ a compositing component, such as compositing component 250 of FIG. 2, to render the virtual environment and each selected geometric representation into a composite virtual environment. In the composite virtual environment, the selected geometric representations or rendered versions thereof (e.g., virtual objects) are presented as being virtually positioned within the virtual environment. While in some embodiments, the virtual environment can be rendered as expected, the selected geometric representations can be rendered by applying extracted portion(s) of corresponding image data received from the set of environmental sensors to the selected geometric representations. In this way, each rendered geometric representation (e.g., virtual object) can include the same visual features (e.g., color, texture) of the corresponding physical objects detected within the physical environment. In some embodiments, the computing device can employ a variety of blending mechanisms to one or more of the virtual environment and the generated virtual objects to facilitate increased realism, and to maintain thematic consistency with the virtual environment. As described in accordance with FIGS. 3-5, the computing device can employ a blending component, such as blending component 254, to effectively blend the composite virtual environment in a desirable manner.

In some embodiments, the computing device can include a pass-through component, such as pass-through component 252 of FIG. 2, that can receive one or more inputs from an input device (e.g., a controller). The pass-through component can receive the input(s) to select portions of received image data for pass-through display to the HMD. That is, apart from any virtual objects generated for compositing into the virtual environment, the pass-through component can receive one or more inputs that define areas of received image data to be viewed by the user. In some aspects, the input can be received from a controller that is in paired communication with the computing device. A determined relative orientation and/or position of the controller (e.g., to the HMD, user, sensors) can be tracked, such that the computing device can employ the input(s) in a way that the controller behaves like a "flashlight" into the user's physical environment. Similar to a flashlight, the controller can provide inputs that the computing device can employ to provide selective visibility of the physical environment to the user.

At block 640, the computing device can employ a stereoscopic displaying component, such as stereoscopic displaying component 260 of FIG. 2, to provide for display the rendered composite virtual environment to the HMD. Employing various techniques described herein, the computing device can detect physical objects within a user's physical environment, generate virtual objects based on depth maps and/or image data corresponding to the detected physical objects, and effectively blend them into a virtual environment such that a composite virtual environment is provided for display for viewing via a HMD. In this way, a user can remain fully-immersed in virtual reality, while remaining aware of their physical environment. Further, the compositing techniques employed herein facilitate an improved user experience, such that the generated virtual objects do not appear awkwardly placed or awkwardly in contrast with a theme associated with the virtual environment. Similarly, various pass-through techniques described herein facilitate both automatic or manually selected viewing of pass-through image data, such that the user can perceive image data corresponding to their physical environment while remaining immersed in virtual reality.

Figure 7:
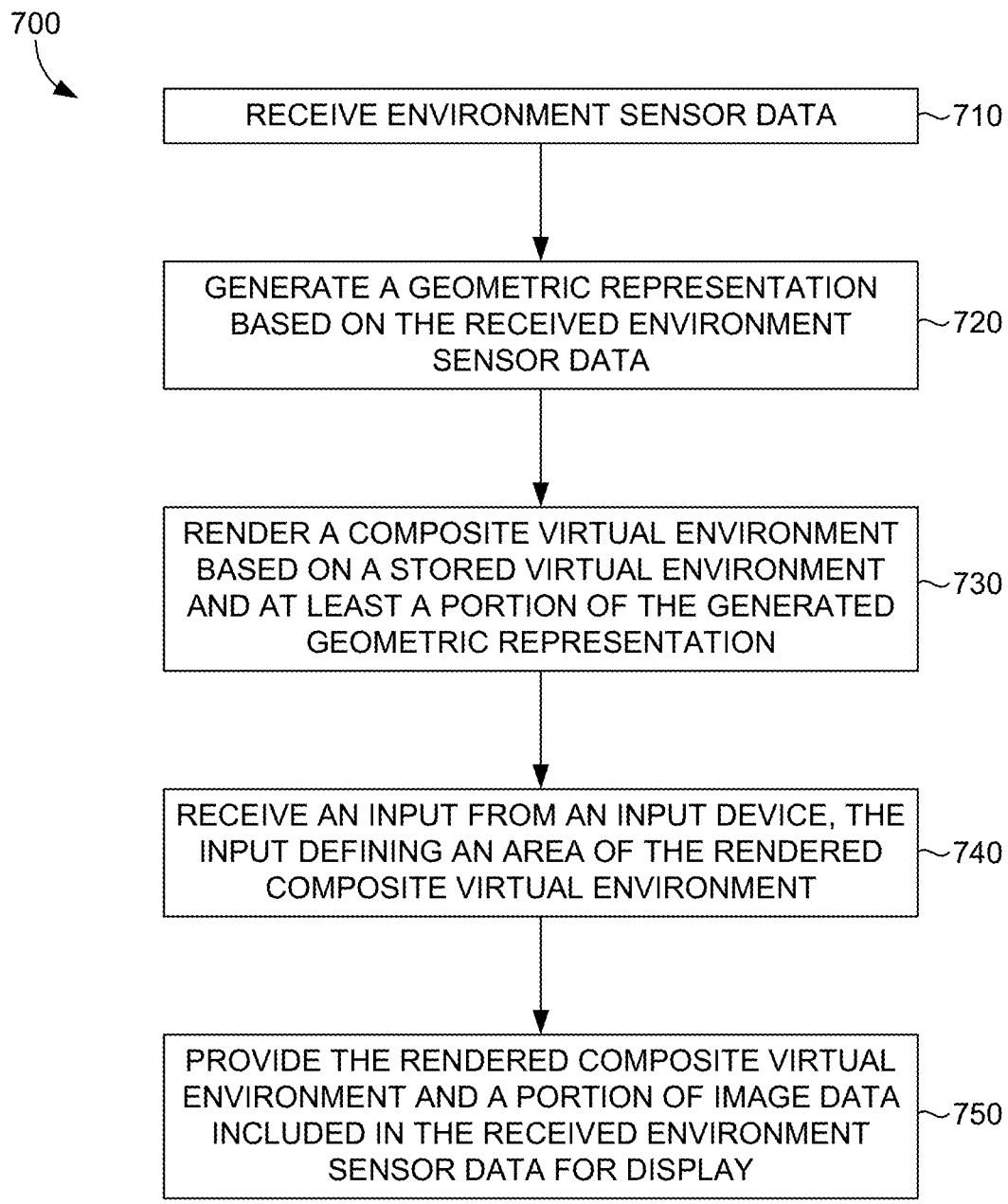
FIG. 7 is a flow chart depicting another exemplary process flow for rendering and compositing a virtual environment and dynamically generated virtual objects on-the-fly, in accordance with some embodiments of the present disclosure.

Referring now to FIG. 7, a flow diagram is provided depicting a method 700 for dynamically rendering and updating a fully-immersive virtual environment in real-time. In various embodiments, a head-mounted display (HMD) (e.g., HMD 110 of FIG. 1) is coupled to a computing device, such as reality blending device 115 of FIG. 1 or 210 of FIG. 2. In some embodiments, the HMD can be coupled to a set of tracking sensors, such as tracking sensors 120*a* of FIG. 1, and a set of environmental sensors, such as environmental sensors 120*b* of FIG. 1. In some embodiments, the environmental sensors 120*b* include acoustic and/or optical sensors that can generate, among other things, depth map frames and corresponding frames of image data, based on captured acoustic and/or optical information associated with a portion of the physical environment. In other words, the environmental sensors 120*b* can receive acoustic and/or optical information and generate, for any point in time, a depth map frame and a corresponding image data frame. In various embodiments, any one or more of the sensors can be rigidly fixed to the HMD or to a physical structure of the user's physical environment. Initially, at block 710, the computing device can receive environmental sensor data from the set of environmental sensors. It is contemplated that a user is wearing the HMD, such that the HMD is secured to the user's head and that the user can view a graphical output generated for display by the computing device to the HMD.

At block 720, the computing device can generate a geometric representation (e.g., a mesh) of at least a portion of the physical environment based on the received environment sensor data. For instance, a depth map frame received from at least one of the environmental sensors can be employed to generate the geometric representation of the physical environment or the portion thereof captured by the environmental sensors (e.g., within the field of view or tracking area). Among other things, the computing device can include a physical object modeling component, such as physical object modeling component 244 of FIG. 2, to segment portions of the generated geometric representation of the physical environment into individual generated geometric representations. The physical object modeling component can determine that one or more portions of the received depth map frame corresponds to a particular type of structure or object, based on a determined height, depth or relative distance, shape, or other characteristics thereof. In some embodiments, the physical object modeling component can further associate one or more portions of the depth map frame with a tag or label, such that certain portions of the depth map frame can be identified by the computing device as a particular type of structure or object, such as a floor or navigable area, a wall, a ceiling, or other physical object or obstruction, by way of example.

In some embodiments, the computing device can employ a physical object selecting component, such as physical object selecting component 246 of FIG. 2, to dynamically select one or more of the generated geometric representations based on one or more determined characteristics thereof. Based on the determined characteristics of a physical object corresponding to a generated geometric representation, or similarly, based on determined characteristics of a generated geometric representation corresponding to a detected physical object, the physical object selecting component can select any one or more generated geometric representations to be rendered and composited into a virtual environment stored in a memory of the computing device. Among other things, determinable characteristics of a geometric representation or corresponding physical object can include relative depth or distance, motion, shape, visual classification, virtual position of the user within the virtual environment, or a stage/level within the virtual environment.

At block 730, the computing device can employ a compositing component, such as compositing component 250 of FIG. 2, to render the virtual environment and each selected geometric representation into a composite virtual environment. In the composite virtual environment, the selected geometric representations or rendered versions thereof (e.g., virtual objects) are presented as being virtually positioned within the virtual environment. While in some embodiments, the virtual environment can be rendered as expected, the selected geometric representations can be rendered by applying extracted portion(s) of corresponding image data received from the set of environmental sensors to the selected geometric representations. In this way, each rendered geometric representation (e.g., virtual object) can include the same visual features (e.g., color, texture) of the corresponding physical objects detected within the physical environment. In some embodiments, the computing device can employ a variety of blending mechanisms to one or more of the virtual environment and the generated virtual objects to facilitate increased realism, and to maintain thematic consistency with the virtual environment. As described in accordance with FIGS. 3-5, the computing device can employ a blending component, such as blending component 254, to effectively blend the composite virtual environment in a desirable manner.

At block 740, the computing device can employ a stereoscopic displaying component, such as stereoscopic displaying component 260 of FIG. 2, to provide for display the rendered composite virtual environment to the HMD. Employing various techniques described herein, the computing device can detect physical objects within a user's physical environment, generate virtual objects based on depth maps and/or image data corresponding to the detected physical objects, and effectively blend them into a virtual environment such that a composite virtual environment is provided for display for viewing via a HMD.

At block 750, the computing device can employ a pass-through component, such as pass-through component 252 of FIG. 2, that can receive one or more inputs from an input device (e.g., a controller). The pass-through component can receive the input(s) to select portions of received image data for pass-through display to the HMD. That is, apart from any virtual objects generated for compositing into the virtual environment, the pass-through component can receive one or more inputs that define areas of received image data to be viewed by the user. In some aspects, the input can be received from a controller that is in paired communication with the computing device. A determined relative orientation and/or position of the controller (e.g., to the HMD, user, sensors) can be tracked, such that the computing device can employ the input(s) in a way that the controller behaves like a "flashlight" into the user's physical environment. Similar to a flashlight, the controller can provide inputs, which the computing device can employ to provide selective visibility (e.g., corresponding image data) of the physical environment to the user. In this way, a user can remain fully-immersed in virtual reality, while remaining aware of their physical environment. Further, the compositing techniques employed herein facilitate an improved user experience, such that the generated virtual objects do not appear awkwardly placed or awkwardly in contrast with a theme associated with the virtual environment. Similarly, various pass-through techniques described herein facilitate both automatic or manually selected viewing of pass-through image data, such that the user can perceive image data corresponding to their physical environment while remaining immersed in virtual reality.

Figure 8:
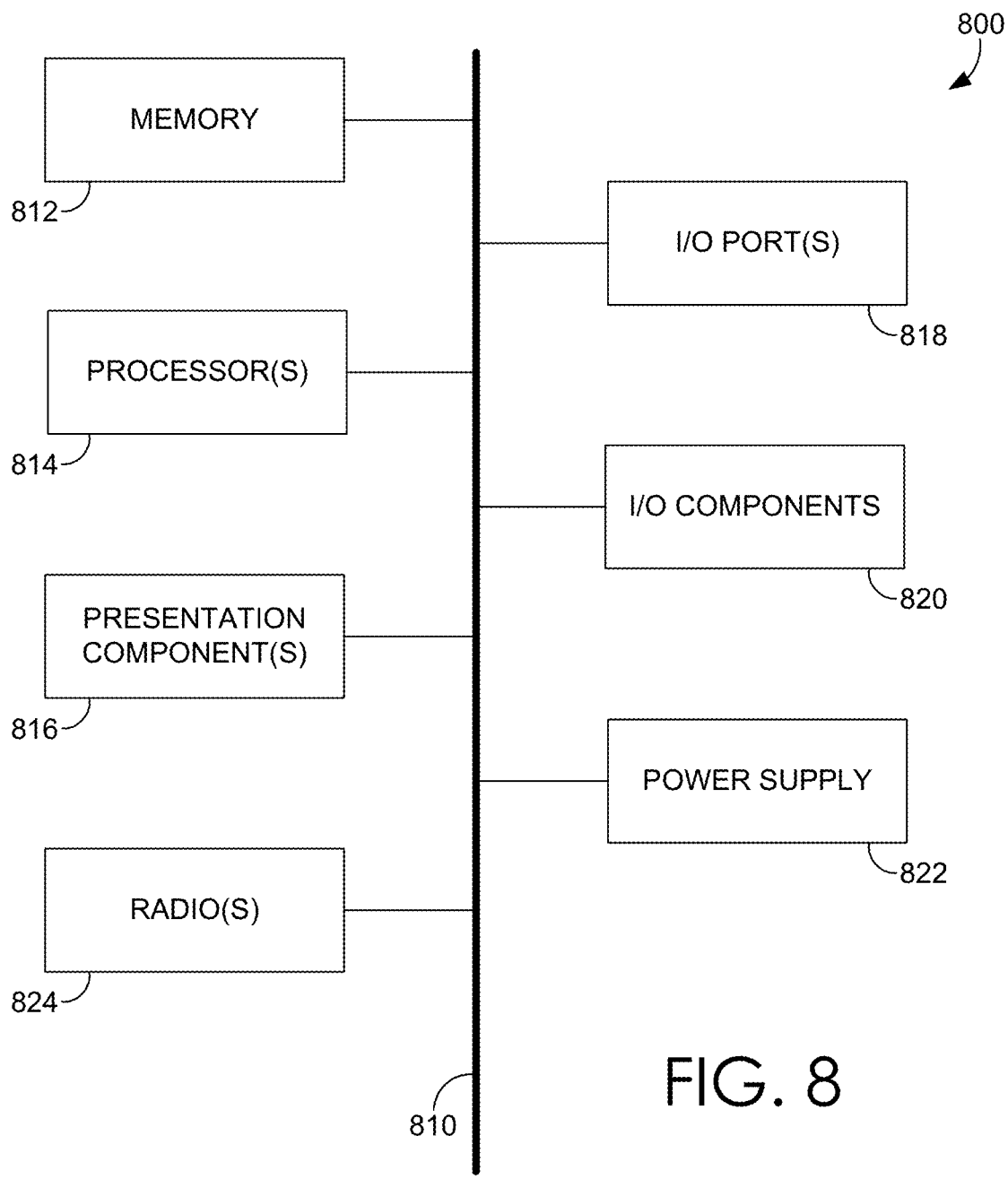
FIG. 8 is a block diagram of an exemplary computing environment suitable for use in accordance with some embodiments of the present disclosure.

With reference now to FIG. 8, computing device 800 includes a bus 810 that directly or indirectly couples the following devices: memory 812, one or more processors 814, one or more presentation components 816, input/output ports 818, input/output components 820, and an illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 8 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of the detailed discussion above, embodiments of the present invention are described with reference to a head-mounted display unit comprising or coupled to a virtualizing computing device; however, the head-mounted display unit depicted herein is merely exemplary. Components can be configured for performing novel aspects of embodiments, where configured for comprises programmed to perform particular tasks or implement particular abstract data types using code. Further, while embodiments of the present invention may generally refer to the head-mounted display unit and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer-implemented method for blending physical reality with virtual reality, the method comprising:
   receiving, by a computing device, environmental sensor data from a set of environmental sensors in a physical environment;
   generating, by the computing device, a colorized geometric representation of an object in the physical environment based on the received environmental sensor data;
   rendering, by the computing device, a blended virtual environment based on the generated colorized geometric representation of the object and a virtual environment stored in memory, wherein the blended virtual environment includes an alpha blend of the virtual environment and the colorized geometric representation of the object; and
   providing, by the computing device, the rendered blended virtual environment for display to a head-mounted display (HMD) coupled to the computing device.

2. The method of claim 1, wherein the environmental sensor data includes depth map data and image data.

3. The method of claim 2, wherein the geometric representation of the object in the physical environment is generated based on the depth map data, texturized based on visual data extracted from the image data, and colorized based on color information extracted from each of the image data and the stored virtual environment.

4. The method of claim 2, further comprising:
segmenting, by the computing device, a portion of the depth map data corresponding to the object from the depth map data corresponding to the physical environment.

5. The method of claim 4, wherein the portion of the depth map data is segmented from the depth map data based on a determination that the portion of the depth map data corresponds to a known object.

6. The method of claim 4, further comprising:
removing, by the computing device, segmented portions of the depth map data corresponding to non-salient objects detected in the physical environment, wherein the object is a determined salient object.

7. The method of claim 1, wherein the colorized geometric representation is generated in response to receiving the environmental sensor data, the blended virtual environment is rendered in response to generating the colorized geometric representation, and the rendered blended virtual environment is provided for display in response to rendering the blended virtual environment.

8. The method of claim 1, further comprising:
modifying, by the computing device, colors of the colorized geometric representation based on a hue or a color scheme of the virtual environment.

9. The method of claim 1, further comprising:
determining, by the computing device, that the object is within a threshold distance from the set of environmental sensors, and
wherein the colorized geometric representation of the object is generated based on the determination that the object is within the threshold distance.

10. A computer storage medium storing computer-useable instructions that, when used by one or more computing devices, cause the one or more computing devices to perform operations comprising:
receiving environmental sensor data from a set of environmental sensors in a physical environment;
generating a colorized geometric representation of an object in the physical environment based on the received environmental sensor data and a color scheme of a virtual environment stored in memory;
rendering a blended virtual environment based on the generated colorized geometric representation of the object and the stored virtual environment, wherein the blended virtual environment includes an alpha blend of the virtual environment and the colorized geometric representation of the object; and
providing the rendered blended virtual environment for display to a head-mounted display (HMD) coupled to the computing device.

11. The medium of claim 10, wherein the environmental sensor data includes depth map data and image data.

12. The medium of claim 11, wherein the geometric representation of the object in the physical environment is generated based on the depth map data, textured based on visual data extracted from the image data, and colorized based on color information extracted from the image data and the stored virtual environment.

13. The medium of claim 11, the operations further comprising:
segmenting a portion of the depth map data corresponding to the object from the depth map data corresponding to the physical environment.

14. The medium of claim 13, wherein the portion of the depth map data is segmented from the depth map data based on a determination that the portion of the depth map data corresponds to a known object.

15. The medium of claim 13, wherein the object is a determined salient object.

16. The medium of claim 15, the operations further comprising:
removing segmented portions of the depth map data corresponding to non-salient objects detected in the physical environment.

17. The medium of claim 10, wherein the colorized geometric representation is generated in response to receiving the environmental sensor data, the blended virtual environment is rendered in response to generating the colorized geometric representation, and the rendered blended virtual environment is provided for display in response to rendering the blended virtual environment.

18. A computerized system comprising:
at least one processor; and
at least one computer storage medium storing computer-useable instructions that, when used by the at least one processor, cause the at least one processor to perform operations comprising:
receiving environmental sensor data from a set of environmental sensors in a physical environment;
generating a colorized geometric representation of an object in the physical environment based on the received environmental sensor data and a color distribution of a virtual environment stored in memory;
rendering a blended virtual environment based on the generated colorized geometric representation of the object and the stored virtual environment, wherein the blended virtual environment includes an alpha blend of the virtual environment and the colorized geometric representation of the object; and
providing the rendered blended virtual environment for display to a head-mounted display (HMD) coupled to the computing device.

19. The system of claim 18, wherein the geometric representation of the object in the physical environment is generated based on depth map data included in the environmental sensor data and is colorized based on color information extracted from image data included in the environmental sensor data and the stored virtual environment.

20. The system of claim 18, the operations further comprising:
segmenting a portion of the depth map data corresponding to the object from the depth map data corresponding to the physical environment.

* * * * *